(12) United States Patent
Huang et al.

(10) Patent No.: US 9,146,429 B2
(45) Date of Patent: Sep. 29, 2015

(54) DISPLAY PANEL

(71) Applicant: Au Optronics Corporation, Hsinchu (TW)

(72) Inventors: Te-Chun Huang, New Taipei (TW);
Kuo-Yu Huang, Hsinchu County (TW);
Yu-Han Huang, Taipei (TW); Yi-Ji Tsai, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 57 days.

(21) Appl. No.: 14/205,378

(22) Filed: Mar. 12, 2014

(65) Prior Publication Data
US 2015/0138465 A1    May 21, 2015

(30) Foreign Application Priority Data
Nov. 20, 2013    (TW) .............................. 102142334 A

(51) Int. Cl.
*G02F 1/1343*    (2006.01)
*G02F 1/1333*    (2006.01)
*G02F 1/1362*    (2006.01)
*G02F 1/1368*    (2006.01)

(52) U.S. Cl.
CPC ........ *G02F 1/134309* (2013.01); *G02F 1/1368* (2013.01); *G02F 1/13439* (2013.01); *G02F 1/133345* (2013.01); *G02F 1/136213* (2013.01); *G02F 1/136227* (2013.01); *G02F 2001/134372* (2013.01)

(58) Field of Classification Search
CPC ...................... G02F 1/136213; G02F 1/136227
See application file for complete search history.

(56) References Cited

U.S. PATENT DOCUMENTS

| 7,142,260 | B2 * | 11/2006 | Yang ............................. 349/38 |
| 8,189,130 | B2   | 5/2012  | Chen et al. |
| 8,592,814 | B2   | 11/2013 | Yamazaki et al. |
| 8,791,458 | B2   | 7/2014  | Yamazaki et al. |
| 2011/0068334 | A1 | 3/2011 | Yamazaki et al. |
| 2011/0095299 | A1 | 4/2011 | Tsuji et al. |
| 2013/0321726 | A1* | 12/2013 | Lee et al. ........................ 349/38 |
| 2014/0078440 | A1 | 3/2014 | Yamazaki et al. |

FOREIGN PATENT DOCUMENTS

| TW | M379076 | 4/2010 |
| TW | 201126245 | 8/2011 |

* cited by examiner

*Primary Examiner* — Phu Vu
(74) *Attorney, Agent, or Firm* — Jianq Chyun IP Office

(57) ABSTRACT

A display panel, which has a display region and a non-display region, includes an active array substrate and an opposite substrate disposed opposite to the active array substrate. The active array substrate includes a substrate, a pixel array, and a driving circuit. The pixel array and the driving circuit are disposed on the substrate, wherein the pixel array is located in the display region and the driving circuit is located in the non-display region. The driving circuit includes a first transparent electrode layer, a second transparent electrode layer, and a dielectric layer. The dielectric layer is located between the first transparent electrode layer and the second transparent electrode layer, wherein the first transparent electrode layer and the second transparent electrode layer are electrically coupled to each other to form at least one transparent capacitor.

22 Claims, 16 Drawing Sheets

DISPLAY PANEL

CROSS-REFERENCE TO RELATED APPLICATION

This application claims the priority benefit of Taiwan application serial no. 102142334, filed on Nov. 20, 2013. The entirety of the above-mentioned patent application is hereby incorporated by reference herein and made a part of this specification.

TECHNICAL FIELD

The invention relates generally to a display, and more particularly to a display panel having a driving circuit structure.

RELATED ART

In recent years, with the advances in technologies and the semiconductor industry, users are placing increasing demands on the digital products. Therefore, display screens have been emphasized by researchers due to the important role they play in digital products, and the liquid crystal display (LCD) panel has become mainstream among the display screens.

Generally speaking, the LCD panel is formed by assembling the device substrate and the opposite substrate together with a sealant, and injecting a liquid crystal layer between the device substrate and the opposite substrate. The device substrate may be an active array substrate or a passive array substrate, and the opposite substrate may be a typical blank substrate or a substrate having an electrode film or a color filter layer disposed thereon. The LCD panel includes a display region and a non-display region. The devices (e.g. the pixel array and the display medium) in the LCD panel used for image display are disposed in the display region. Moreover, to achieve a slim border, techniques have been developed to dispose the gate driver on array (GOA) to drive the display panel in the non-display region of the display panel.

In GOA designs, the components of the GOA structure are typically disposed at the sealant area of the display panel. In order to make the sealant completely reacted by UV, a sufficient transparent region is typically required at the sealant area. However, since the GOA structure disposed at the sealant area is designed with non-transparent metal, the components of the GOA cannot be densely designed, which results in failure to achieve the slim border of the display panel.

SUMMARY

The invention provides a display panel capable of improving the components of the gate driver on array (GOA) to enable a dense design, thereby achieving a preferable slim border for the display panel.

The invention provides a display panel having a display region and a non-display region. The display panel includes an active array substrate and an opposite substrate disposed opposite to the active array substrate. The active array substrate includes a substrate, a pixel array, and a driving circuit. The pixel array and the driving circuit are disposed on the substrate, the pixel array is located in the display region, and the driving circuit is located in the non-display region. The driving circuit includes a first transparent electrode layer, a second transparent electrode layer, and a dielectric layer. The dielectric layer is located between the first transparent electrode layer and the second transparent electrode layer, in which the first transparent electrode layer and the second transparent electrode layer are electrically coupled to each other to form at least one transparent capacitor.

The invention also provides a display panel having a display region and a non-display region. The display panel includes an active array substrate, an opposite substrate, and a sealant. The active array substrate includes a substrate, a pixel array, and a driving circuit. The driving circuit includes at least one transparent capacitor. The opposite substrate is disposed opposite to the active array substrate. The sealant covers at least a portion of the at least one transparent capacitor, and the pixel array and the driving circuit are disposed on the substrate. Moreover, the pixel array is located in the display region, and the driving circuit is located in the non-display region.

In summary, the driving circuit of the display panel in the invention includes the transparent capacitor formed by the first transparent electrode layer, the second transparent electrode layer, and the dielectric layer. Since the transparent capacitor can increase the transmittance needed by the sealant curing process, the design of the driving circuit of the display panel can be arranged more densely in the sealant, and thereby reduce the border of the display panel.

To make the above features and advantages of the invention more comprehensible, several embodiments accompanied with drawings are described in detail as follows.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

DESCRIPTION OF EMBODIMENTS

Figure 1:
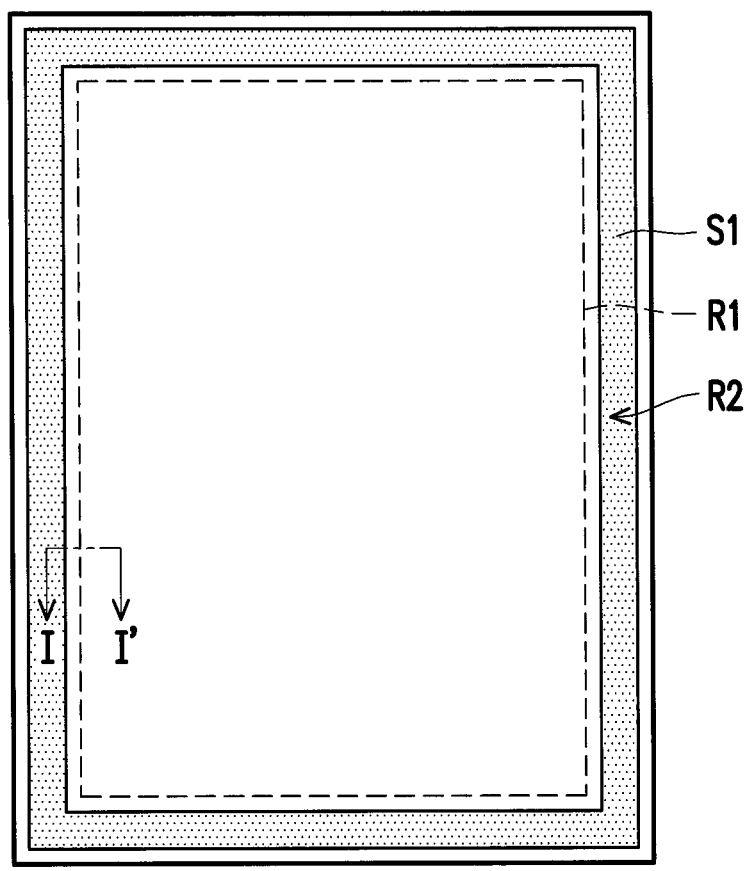
FIG. 1 is a schematic top view of a display panel according to an embodiment of the invention.

FIG. 1 is a schematic view of a display panel according to an embodiment of the invention. With reference to FIG. 1, in the present embodiment, a display panel has a display region R1 and a non-display region R2, in which the non-display region R2 includes a sealant region S1. Since the display panel display images in the display region R1, the devices used for displaying images (e.g. a pixel array and a display medium) in the display panel are disposed in the display region R1. On the other hand, the non-display region R2 does not display images. Therefore, a driving circuit is typically disposed in the non-display region R2 to prevent affecting the appearance of the display panel. In the present embodiment, the display region R1 is a rectangular region, and the non-display region R2 is a frame-shaped region surrounding and adjacent to the display region R1. In other embodiments of the invention, the shape of the display region R1 may be circular, oval, polygonal, or other shapes. Moreover, the shape of the non-display region R2 may be suitably adjusted according to the shape of the display region R1, although the invention is not limited thereto. In addition, the display panel of the present embodiment may use amorphous silicon, oxide semiconductor, or low-temperature polysilicon (LTPS) to serve as the active layer in the thin film transistors (TFTs) of a liquid crystal display (LCD) panel or an organic light emitting diode (OLED) panel, although the invention does not limit the type of the display panels.

First Embodiment

Figure 2:
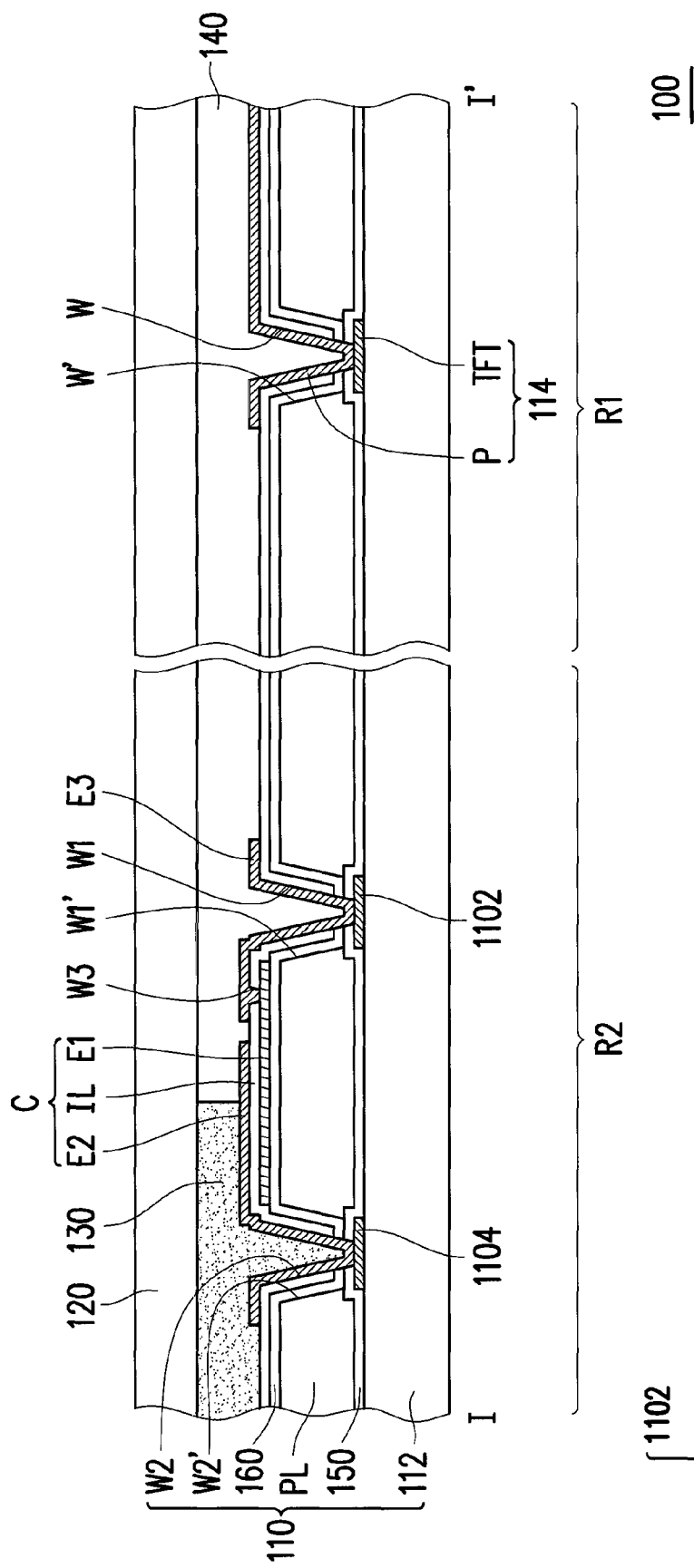
FIG. 2 is a partial cross-section view of the display panel depicted in FIG. 1 along a line I-I' according to a first embodiment of the invention.

FIG. 2 is a partial cross-section view of the display panel depicted in FIG. 1 along a line I-I' according to a first embodiment of the invention. With reference to FIGS. 1 and 2, in the present embodiment, a display panel 100 includes an active array substrate 110, an opposite substrate 120, a sealant 130, and a display medium 140. The opposite substrate 120 is disposed opposite to the active array substrate 110. The active array substrate 110 includes a substrate 112, and a pixel array 114 and a driving circuit DC disposed on the substrate 112. The substrate 112 may be a rigid substrate or a flexible substrate, and the substrate 112 may be made of glass, quartz, organic polymer, or other suitable materials. The pixel array 114 is located in the display region R1, and the driving circuit DC is located in the non-display region R2. The pixel array 114 includes a TFT array and pixel electrodes P electrically connected with the TFT array. To facilitate description, only one thin film transistor TFT is shown in the TFT array 114, but in practice the TFT array includes a plurality of thin film transistors TFT. The pixel array 114 is further detailed in the following description.

The driving circuit DC may be a gate driver on array (GOA) or a shift register, although the invention is not limited thereto. In specifics, the driving circuit DC of the present embodiment includes a first conductive element 1102, a second conductive element 1104, an insulating layer PL, a first transparent electrode layer E1, a second transparent electrode layer E2, a dielectric layer IL, a protection layer 150, and a protection layer 160.

The first conductive element 1102 and the second conductive element 1104 may be TFTs, conductive wires, or a combination thereof. Similarly, when the first conductive element 1102 or the second conductive element 1104 is a TFT, the first conductive element 1102 or the second conductive element 1104 may include a gate, a channel layer, a source, and a drain.

The insulating layer PL may be an inorganic material (e.g., silicon oxide (SiO2), silicon nitride (SiN), silicon oxynitride (SiON), or a combination thereof), or an organic material (e.g., polyester (PET), polyolefin, polypropylene, polycarbonate, polyalkylene oxide, polystyrene, polyether, polyketone, polyalcohol, polyaldehyde, or a combination thereof). A thickness of the insulating layer PL may be adjusted according to a requirement in practice. For example, when the insulating layer PL is made of inorganic materials, the thickness of the insulating layer is approximately 400 nm to 1000 nm. When the insulating layer PL is made of organic materials, the thickness of the insulating layer PL is approximately 800 nm to 4500 nm.

The first transparent electrode layer E1 and/or the second transparent electrode layer E2 and/or a third transparent electrode layer E3 may be made of transparent conductive materials, such as indium tin oxide (ITO), indium zinc oxide (IZO), aluminum tin oxide (ATO), aluminum zinc oxide (AZO), indium gallium zinc oxide (IGZO), other suitable oxides, or stacked layers of at least two of the foregoing materials, although the invention is not limited thereto.

The dielectric layer IL, the protection layer 150, and the protection layer 160 may be made of inorganic dielectric materials, such as silicon nitride (SiNx), silicon dioxide (SiO2), or other suitable materials.

In the present embodiment, the protection layer 150 is located on the first conductive element 1102 and the second conductive element 1104, the insulating layer PL is located on the protection layer 150, and the protection layer 160 is located on the insulating layer PL. The dielectric layer IL is located on the protection layer 160 and between the first transparent electrode layer E1 and the second transparent electrode layer E2. In detail, a plurality of openings W', W1', and W2' are formed in the insulating layer PL. The insulating layer 160 and the dielectric layer IL are filled in the openings W', W1' and W2', and the dielectric layer IL, the protection layer 150, and the protection layer 160 commonly have an opening W, a first opening W1, and a second opening W2. Moreover, the dielectric layer IL has a contact opening W3, in which the first opening W1 and the second opening W2 respectively expose the first conductive element 1102 and the second conductive element 1104. In specifics, the first transparent electrode layer E1 is electrically connected with the first conductive element 1102 through the contact opening W3, the third transparent electrode layer E3, and the first opening W1, and the second transparent electrode layer E2 is electrically connected with the second conductive element 1104 through the second opening W2.

It should be noted that, in the present embodiment, a patterning process using a mask is performed on the insulating layer PL to form the opening W', the first opening W1', and the second opening W2'. A photolithography process and a corresponding etching process using another mask are then performed on the dielectric layer IL, the protection layer 150, and the protection layer 160 to form the opening W, the first opening W1, the second opening W2, and the contact opening W3. However, the invention is not limited thereto. In other embodiments, a single mask or more than two masks may be used to perform a photolithography process and a corresponding etching process on the insulating layer PL, the dielectric layer IL, the protection layer 150, and the protection layer 160. Moreover, the invention does not limit the electrical connection methods of the first transparent electrode layer E1 and the first conductive element 1102, and the electrical connection methods may be adjusted according to the quantity of fabrication masks and the design. Detailed description of the fabrication steps are provided below with reference to the figures and using a single mask fabrication example for the dielectric layer IL and the protection layers 150 and 160.

In the present embodiment, the first transparent electrode layer E1 and the second transparent electrode layer E2 are electrically coupled to each other. The first transparent electrode layer E1, the second transparent electrode layer E2 and the dielectric layer IL may form a transparent capacitor C on the insulating layer PL. As shown in FIG. 2, the driving circuit DC of the present embodiment has a transparent capacitor C, although the invention is not limited thereto. The quantity of the transparent capacitor C of the driving circuit DC may be adjusted as needed. When the driving circuit DC is a shift register or a gate driver, the transparent capacitor C may be located in the shift register or the gate driver.

Since the thickness of the dielectric layer IL is relatively thin, the area occupied by the capacitor C can be reduced when the capacitance value remains the same. Moreover, the insulating layer PL has a fixed thickness as described above, and thus a coupling phenomenon between the transparent capacitor C and any one of the first conductive element 1102 and the second conductive element 1104 can be reduced. Therefore, the transparent capacitor C can be insulated by the insulating layer PL and stacked above the first conductive element 1102 or the second conductive element 1104. Moreover, the transparent capacitor C and the first conductive element 1102 or the second conductive element 1104 can be tightly arranged, thereby reducing a horizontal distance between the transparent capacitor C and any one of the first conductive element 1102 and the second conductive element 1104. In view of the foregoing, compared to the capacitor composed of metal electrodes which is patterned with components of the first conductive element 1102 or the second conductive element 1104, the display panel 100 according to the present embodiment can achieve a slimmer border.

It should be noted that, a voltage difference between the first transparent electrode layer E1 and the second transparent electrode layer E2 in the non-display region R2 is from −40V to +40V, which is larger than the typical operating voltage in the display region R1. Therefore, when the display panel 100 is operating under conditions with water vapor (moisture), the insulating layer PL, if made of organic materials, is prone to absorb moisture and cause deterioration of the transparent capacitor C being contacted, thereby resulting in driving issues for the GOA. In order to prevent the afore-described problems, a protection layer 160 is disposed between the insulating layer PL and the first transparent electrode layer E1 to serve as a barrier layer to prevent water vapor from contacting the first transparent electrode layer E1. Both of the protection layer 160 and the protection layer 150 have the first opening W1 and the second opening W2 for respectively exposing the first conductive element 1102 and the second conductive element 1104.

In the present embodiment, as shown in FIG. 2, the opposite substrate 120 is located opposite to the active array substrate 110. The opposite substrate 120 may be a glass substrate, a substrate configured with film electrodes, or a substrate configured with a color filter array. The sealant 130 is located in the non-display region R2 between the active array substrate 110 and the opposite substrate 120, for assembling the active array substrate 110 and the opposite substrate 120 together. With reference again to FIG. 1, the sealant region S1 in the non-display region R2 surrounds the display region R1, and the sealant 130 is located in the sealant region S1. To be specific, the sealant 130 is located between the active array substrate 110 and the opposite substrate 120, and the sealant 130 covers at least a portion of the driving circuit DC of the active array substrate 110. That is, as shown in FIG. 2, the sealant 130 may cover a portion of the transparent capacitor C, although the invention is not limited thereto. The sealant 130 may be a photo-curable sealant material, although the invention is not limited thereto. It should be noted that, when the sealant 130 is made of a photo-curable sealant material, a sufficient transparent region is needed at the area of the sealant 130 to perform the curing process. However, due to the transparent capacitor C of the present embodiment increasing the transmittance required for curing the sealant 130, therefore, a sufficient transparent region can be assured even if the sealant 130 and the transparent capacitor C are completely overlapping. When compared to display panels that adopt non-transparent capacitors, the display panel 100 of the present embodiment can shrink the design of the driving circuit DC including the transparent capacitor C in the sealant 130, and thereby reduce the border of the display panel 100.

The display medium 140 is located between the active array substrate 110, the opposite substrate 120, and the sealant 130. In specifics, after the active array substrate 110 and the opposite substrate 120 are assembled together by the sealant 130, a containing space is formed between the active array substrate 110, the opposite substrate 120, and the sealant 130. The display medium 140 is disposed in this containing space, which corresponds to the pixel array 114 located in the display region R1. The display medium 140 may be a liquid crystal layer or an OLED material, although the invention is not limited thereto.

In the present embodiment, water vapor is prevented from affecting the transparent capacitor C by the protection layer 160, although the invention is not limited thereto. In other embodiments, the same effects to avoid water vapor may also be made by process or material improvements without needing the protection layer 160. For example, the methods may include lowering the moisture permeability of the insulating layer PL or the sealant 130, filling sealant in grooves formed in the insulating layer PL, or improving the film quality of the dielectric layer IL. Next, the steps for fabricating the display panel 100 of the present embodiment are described in detail with reference to the figures.

Figure 3A:
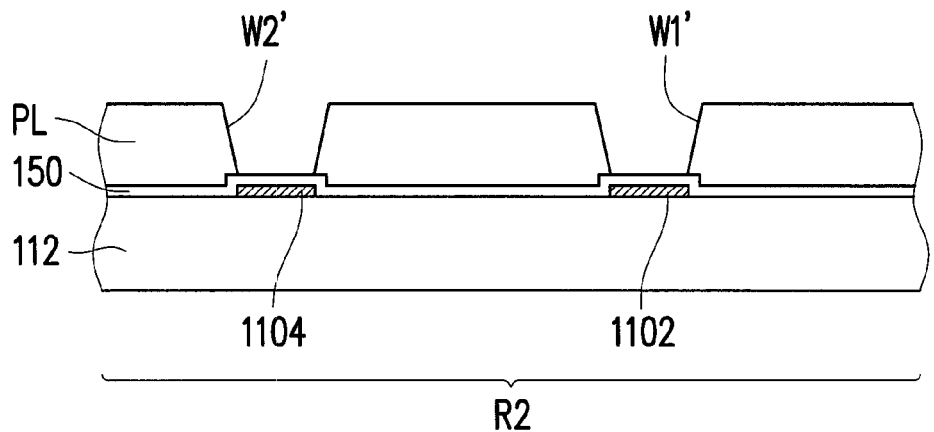
FIGS. 3A-3E are schematic views illustrating a fabrication process of the display panel according to the first embodiment of the invention.

FIGS. 3A-3E are schematic views illustrating a fabrication process of the display panel according to the first embodiment of the invention. In order to clearly describe the fabrication process of the display panel 100 according to the present embodiment, only the components in the non-display region R2 of the display panel 100 are drawn in FIGS. 3A-3E, and the components in the display region R1 are omitted. With reference to FIG. 3A, the first conductive element 1102 and the second conductive element 1104 are formed on the substrate 112. Thereafter, the protection layer 150 is formed on the substrate 112 to cover the first conductive element 1102 and the second conductive element 1104. The insulating layer PL is then formed, and the first opening W1' and the second opening W2' are formed in the insulating layer PL by using a mask.

Figure 3B:
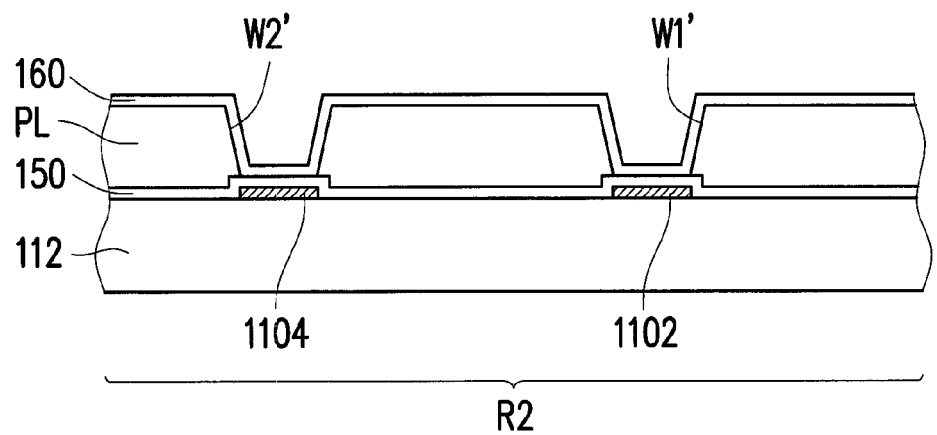
Figure 3C:
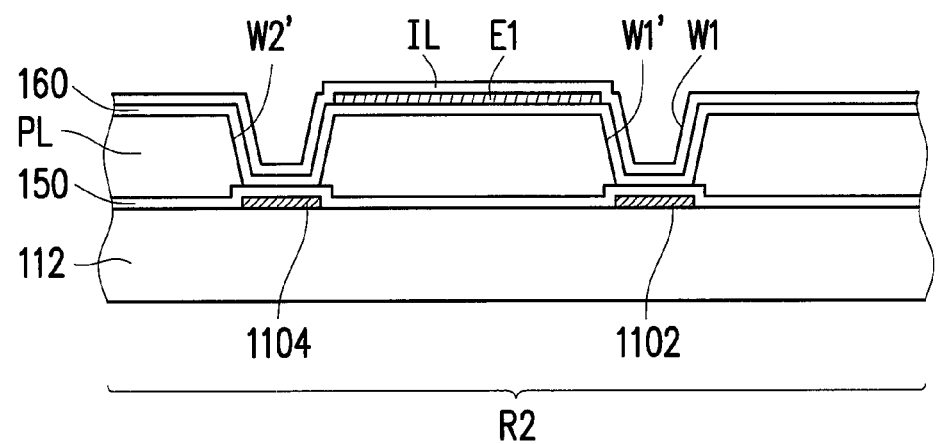
Figure 3D:
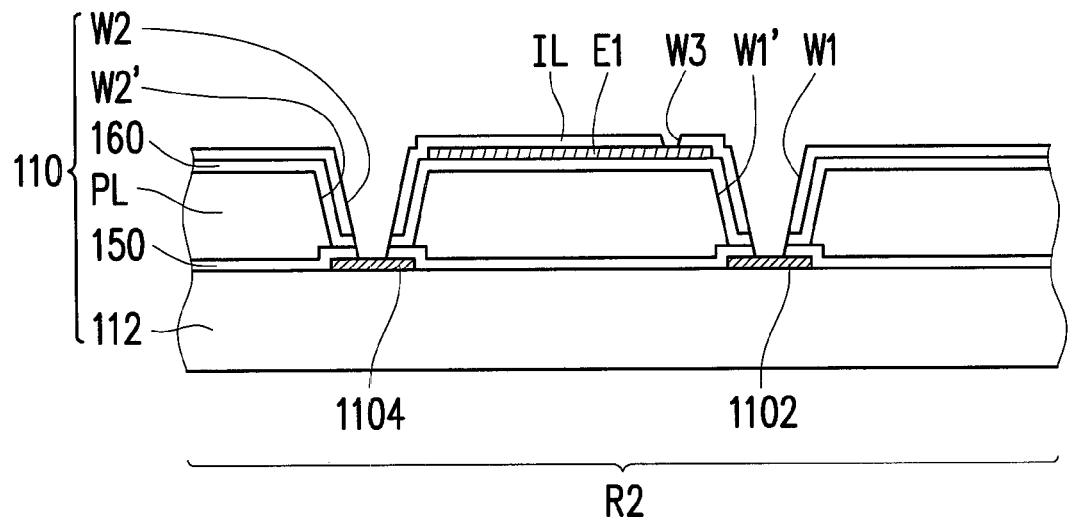

Thereafter, as shown in FIG. 3B, the protection layer 160 is formed on the insulating layer PL. As shown in FIG. 3C, the first transparent electrode layer E1 and the dielectric layer IL are formed in sequence on the protection layer 160. The first transparent electrode layer E1 may be formed by performing photolithography and etching processes on a transparent electrode layer (not drawn) by using a mask. Thereafter, with reference to FIG. 3D, photolithography and etching processes using a mask are performed on the dielectric layer IL, the protection layer 160, and the protection layer 150. Moreover, the first transparent electrode layer E1, the first conductive element 1102, and the second conductive element 1104 are used as etch stop layers, such that the first opening W1 and the second opening W2 are formed in the dielectric layer IL, the protection layer 150, and the protection layer 160, and the contact opening W3 is formed in the dielectric layer IL.

Figure 3E:
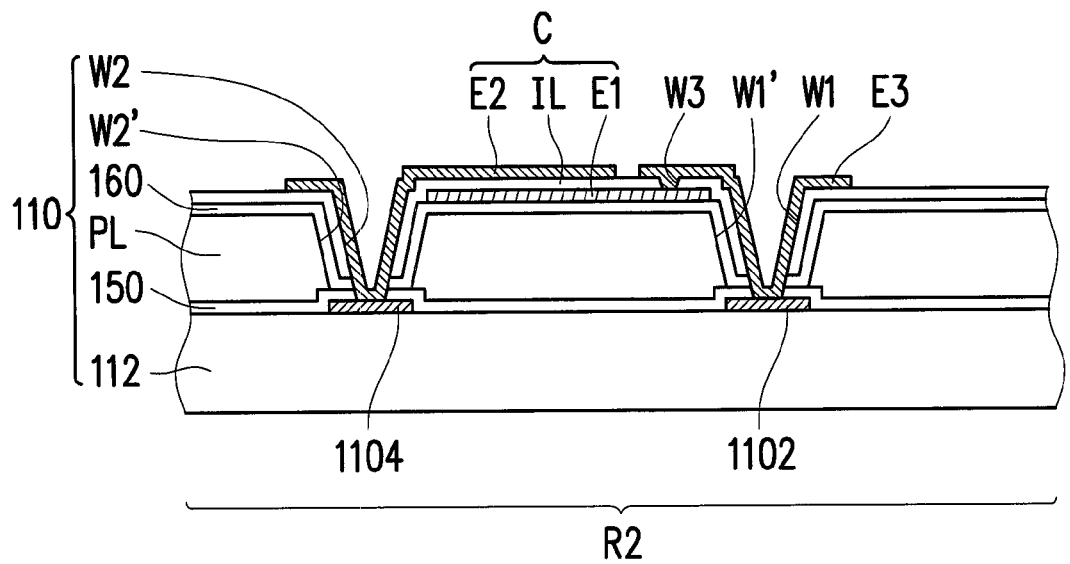

With reference to FIG. 3E, the second transparent electrode layer E2 and the third transparent electrode layer E3 are then formed on the dielectric layer IL. The second transparent electrode layer E2 and the third transparent electrode layer E3 may be formed by patterning a same transparent electrode layer. The first transparent electrode layer E1, the second transparent electrode layer E2, and the dielectric layer IL may form the transparent capacitor C on the insulating layer PL. The first transparent electrode layer E1 is electrically connected with the first conductive element 1102 through the contact opening W3, the third transparent electrode layer E3, and the first opening W1. Accordingly, the fabrication of the active array substrate 110 of the display panel 100 in the present embodiment is complete.

Second Embodiment

Figure 4:
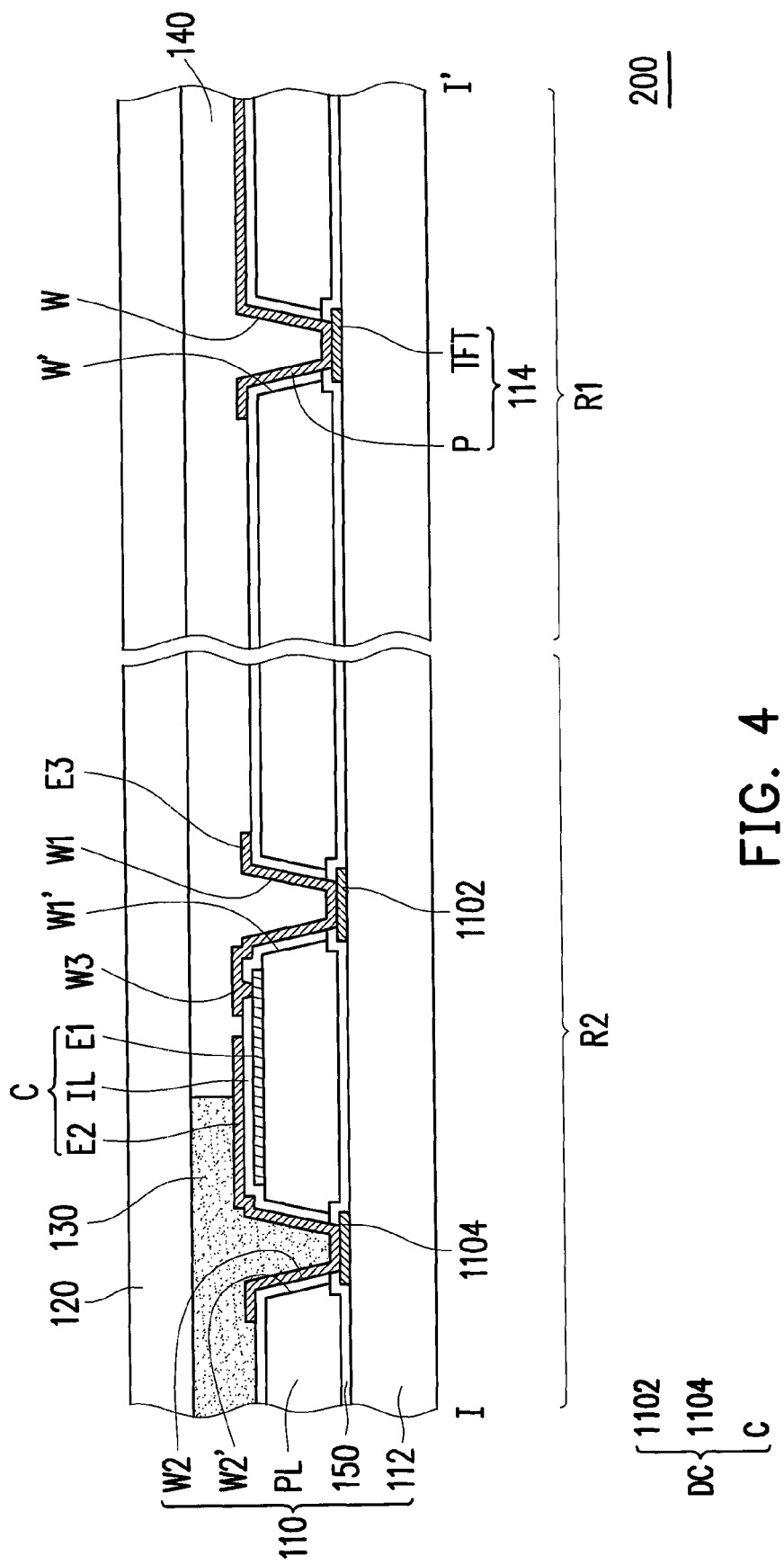
FIG. 4 is a partial cross-section view of the display panel depicted in FIG. 1 along a line I-I' according to a second embodiment of the invention.

FIG. 4 is a partial cross-section view of the display panel depicted in FIG. 1 along the line I-I' according to a second embodiment of the invention. The second embodiment is similar to the first embodiment, and therefore the same or similar elements are labeled with the same or similar reference numbers, and the description thereof are not repeated. A difference between a display panel 200 and the display panel 100 is that, there is no protection layer 160 between the insulating layer PL and the first transparent electrode layer E1 of the display panel 200. It should be noted that, in the present embodiment, a patterning process using a mask is performed on the insulating layer PL to form the openings W', W1', and W2'. A photolithography process and a corresponding etching process using another mask are then performed on the dielectric layer IL and the protection layer 150 to form the opening W, the first opening W1, the second opening W2, and the contact opening W3. However, the invention is not limited thereto. In other embodiments, a single mask or more than two masks may be used to perform a photolithography process and a corresponding etching process on the insulating layer PL, the dielectric layer IL, and the protection layer 150. Moreover, the invention does not limit the methods of the electrical connection between the first transparent electrode layer E1 and the first conductive element 1102, and the methods of the electrical connection may be adjusted according to the quantity of fabrication masks and the design. Detailed description of the fabrication steps are provided below with reference to the figures and using a single mask fabrication example for the dielectric layer IL and the protection layer 150.

By using the afore-described improving methods, the display panel 200 according to the present embodiment can prevent water vapor from deteriorating the transparent capacitor C without requiring the protection layer 160 between the insulating layer PL and the first transparent electrode layer E1. As shown in FIG. 3, the sealant 130 may cover at least a portion of the transparent capacitor C, although the invention is not limited thereto. Similarly, since the transparent capacitor C of the present embodiment can increase the transmittance needed to cure the sealant 130, therefore, a sufficient transparent region can be assured even if the sealant 130 and the transparent capacitor C are completely overlapping. Accordingly, the display panel 200 of the present embodiment can shrink the design of the driving circuit DC including the transparent capacitor C in the sealant 130, and thereby reduce the border of the display panel 200. Next, the steps for fabricating the display panel 200 of the present embodiment are described in detail with reference to the figures.

Figure 5A:
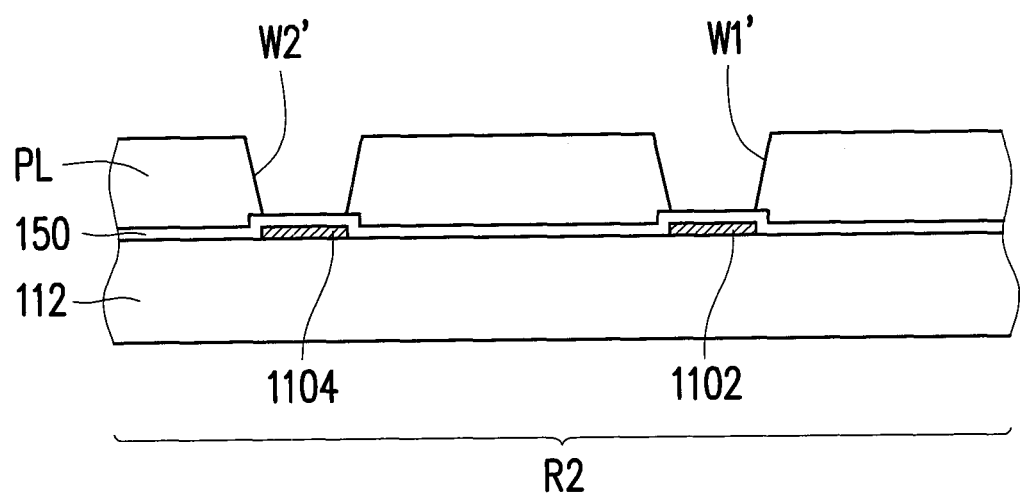
FIGS. 5A-5D are schematic views illustrating a fabrication process of the display panel according to the second embodiment of the invention.

FIGS. 5A-5D are schematic views illustrating a fabrication process of the display panel according to the second embodiment of the invention. In order to clearly describe the fabrication process of the display panel 200 in the present embodiment, only the components in the non-display region R2 of the display panel 200 are drawn in FIGS. 5A-5D, and the components in the display region R1 are omitted. With reference to FIG. 5A, the first conductive element 1102 and the second conductive element 1104 are formed on the substrate 112. The protection layer 150 is then formed on the substrate 112 to cover the first conductive element 1102 and the second conductive element 1104. Thereafter, the insulating layer PL is formed, and the first opening W1' and the second opening W2' are formed in the insulating layer PL by using a mask.

Figure 5B:
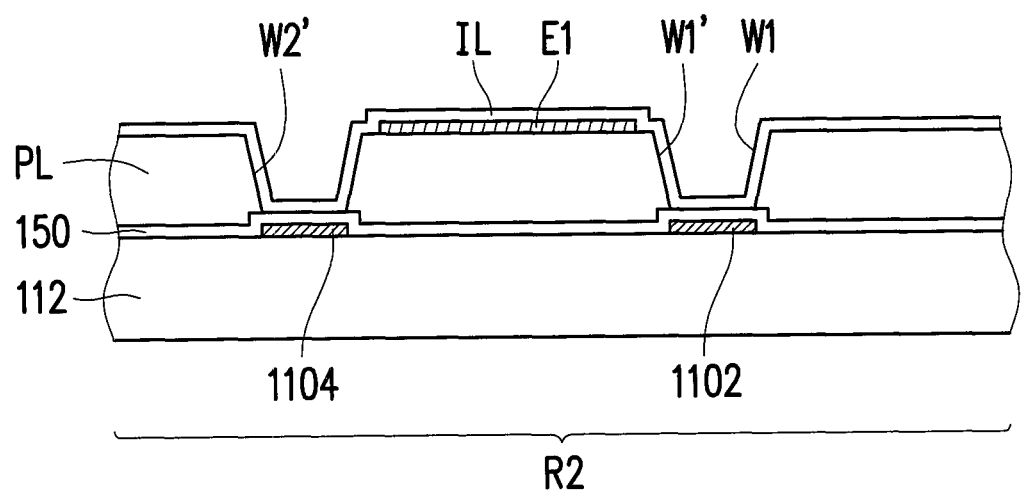
Figure 5C:
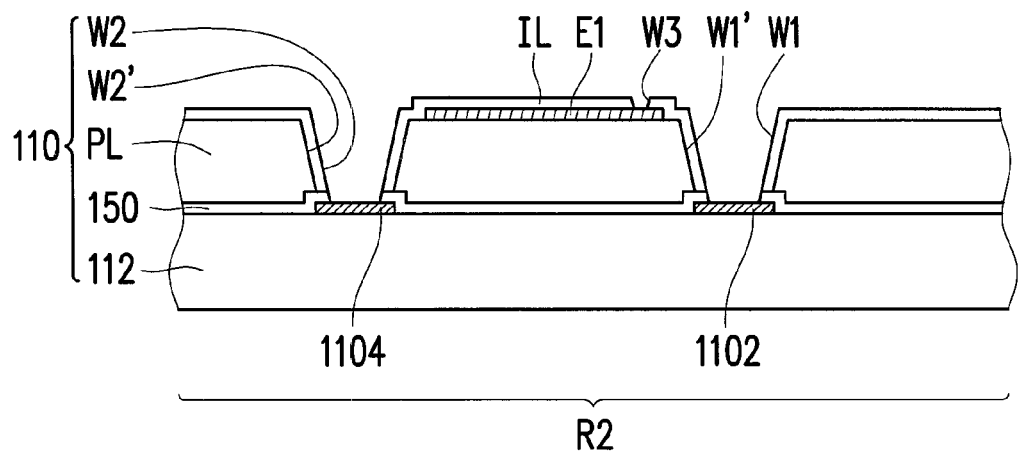

Referring to FIG. 5B, the first transparent electrode layer E1 and the dielectric layer IL are then formed on the insulating layer PL in sequence. Thereafter, with reference to FIG. 5C, photolithography and etching processes using a mask are performed on the dielectric layer IL and the protection layer 150. Moreover, the first transparent electrode layer E1, the first conductive element 1102, and the second conductive element 1104 are used as etch stop layers, such that the first opening W1 and the second opening W2 are formed in the dielectric layer IL and the protection layer 150, and the contact opening W3 is formed in the dielectric layer IL.

Figure 5D:
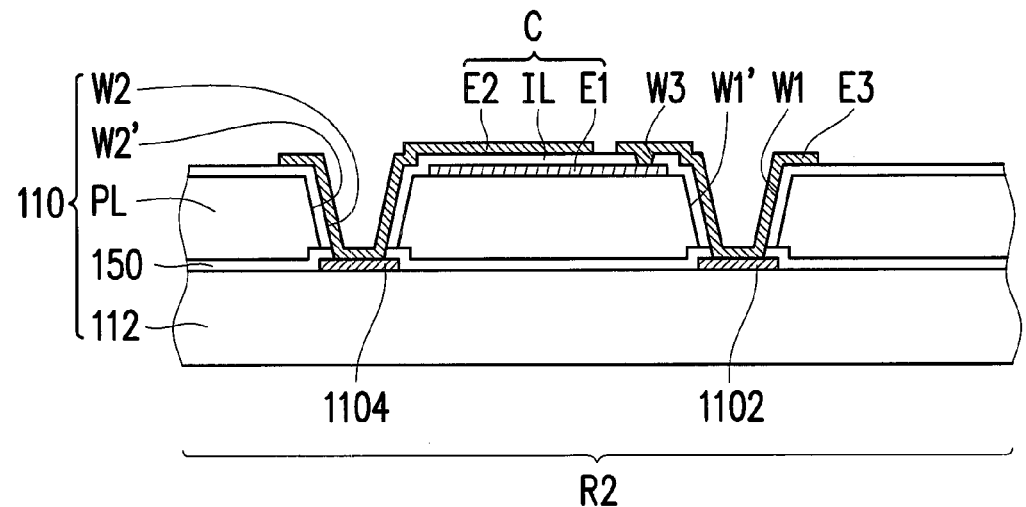

With reference to FIG. 5D, the second transparent electrode layer E2 and the third transparent electrode layer E3 are then formed on the dielectric layer IL. The first transparent electrode layer E1, the second transparent electrode layer E2, and the dielectric layer IL may form the transparent capacitor C on the insulating layer PL. The first transparent electrode layer E1 is electrically connected with the first conductive element 1102 through the contact opening W3, the third transparent electrode layer E3, and the first opening W1. Accordingly, the fabrication of the active array substrate 110 of the display panel 200 in the present embodiment is complete.

Third Embodiment

Figure 6:
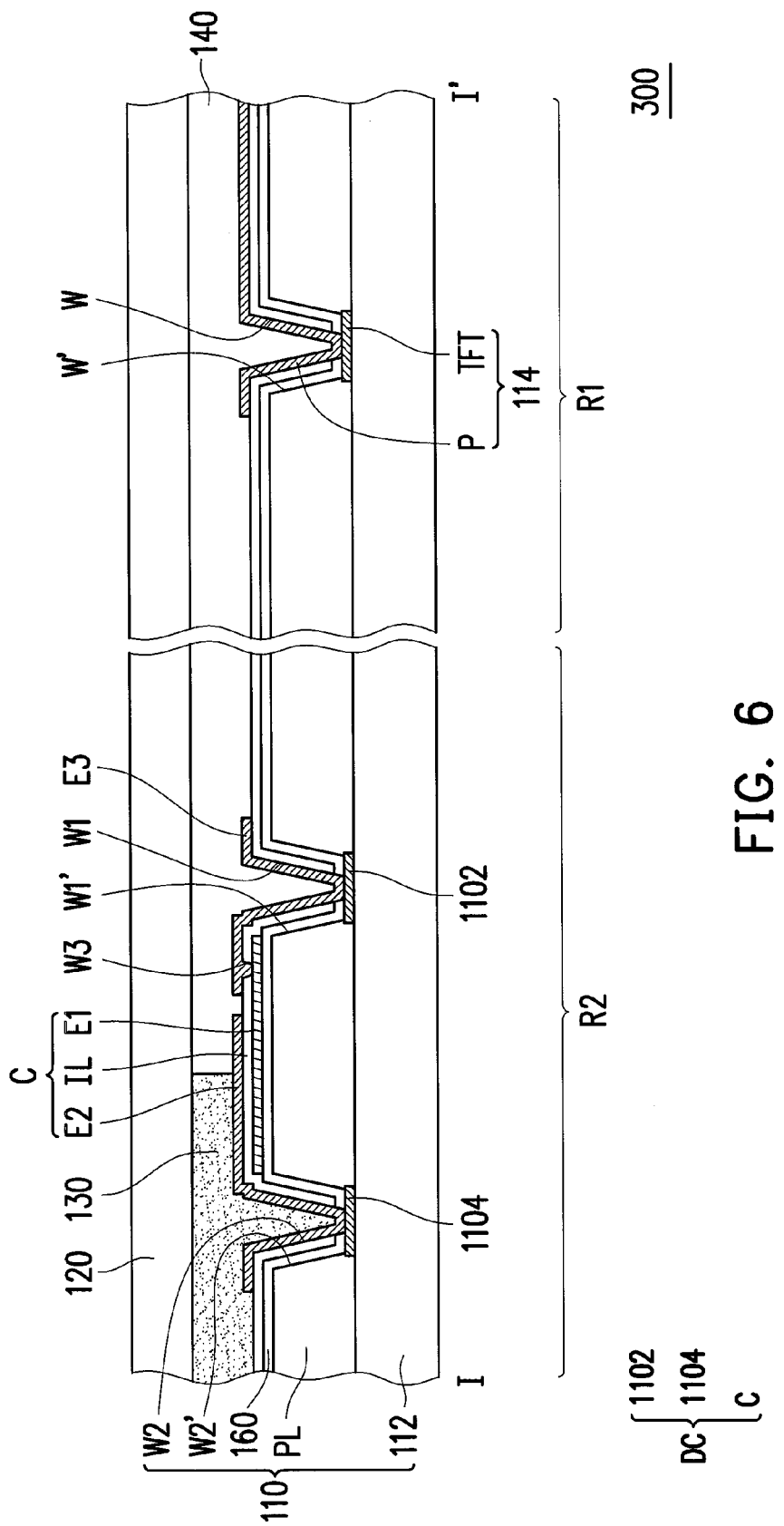
FIG. 6 is a partial cross-section view of the display panel depicted in FIG. 1 along the line I-I' according to a third embodiment of the invention.

FIG. 6 is a partial cross-section view of the display panel depicted in FIG. 1 along the line I-I' according to a third embodiment of the invention. The third embodiment is similar to the first embodiment, and therefore the same or similar elements are labeled with the same or similar reference numbers, and the description thereof are not repeated. A difference between a display panel 300 and the display panel 100 is that, there is no protection layer 150 on the first conductive element 1102 and the second conductive element 1104. That is, the insulating layer PL is directly above the first conductive element 1102 and the second conductive element 1104. Similarly, the dielectric layer IL and the protection layer 160 commonly have the first opening W1 and the second opening W2. Moreover, the dielectric layer IL also has the contact opening W3, in which the first opening W1 and the second opening W2 respectively expose the first conductive element 1102 and the second conductive element 1104. In specifics, the first transparent electrode layer E1 is electrically connected with the first conductive element 1102 through the contact opening W3, the third transparent electrode layer E3, and the first opening W1, and the second transparent electrode layer E2 is electrically connected with the second conductive element 1104 through the second opening W2. Similarly, in the present embodiment, a patterning process using a mask is performed on the insulating layer PL to form the opening W', the first opening W1', and the second opening W2'. A photolithography process and a corresponding etching process using another mask are performed on the dielectric layer IL and the protection layer 160 to form the opening W, the first opening W1, the second opening W2, and the contact opening W3. However, the invention is not limited thereto. In other embodiments, a single mask or more than two masks may be used to perform a photolithography process and a corresponding etching process on the insulating layer PL, the dielectric layer IL, and the protection layer 160. Moreover, the invention does not limit the methods of the electrical connection between the first transparent electrode layer E1 and the first conductive element 1102, and the methods of the electrical connection may be adjusted according to the fabrication process or design. The fabrication steps are described in detail below with reference to the figures.

As shown in FIG. 6, the sealant 130 may cover a portion of the transparent capacitor C, although the invention is not limited thereto. Similarly, since the transparent capacitor C of the present embodiment can increase the transmittance needed to cure the sealant 130, therefore, a sufficient transparent region can be assured even if the sealant 130 and the transparent capacitor C are completely overlapping. Accordingly, the display panel 300 of the present embodiment can shrink the design of the driving circuit DC including the transparent capacitor C in the sealant 130, and thereby reduce the border of the display panel 300. Detailed description of the fabrication steps of the display panel 300 in the present embodiment are provided below with reference to the figures and using a single mask fabrication example for the dielectric layer IL and the protection layer 160.

Figure 7A:
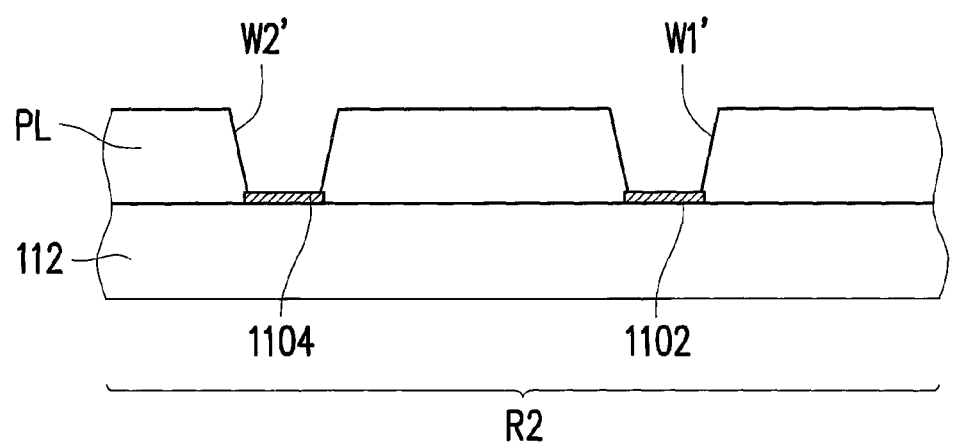
FIGS. 7A-7E are schematic views illustrating a fabrication process of the display panel according to the third embodiment of the invention.

FIGS. 7A-7E are schematic views illustrating a fabrication process of the display panel according to the third embodiment of the invention. In order to clearly describe the fabrication process of the display panel 300 in the present embodiment, only the components in the non-display region R2 of the display panel 300 are drawn in FIGS. 7A-7E, and the components in the display region R1 are omitted. With reference to FIG. 7A, the first conductive element 1102 and the second conductive element 1104 are formed on the substrate 112. The insulating layer PL is then formed on the substrate 112 to cover the first conductive element 1102 and the second conductive element 1104. The first opening W1' and the second opening W2' are formed in the insulating layer PL by using a mask.

Figure 7B:
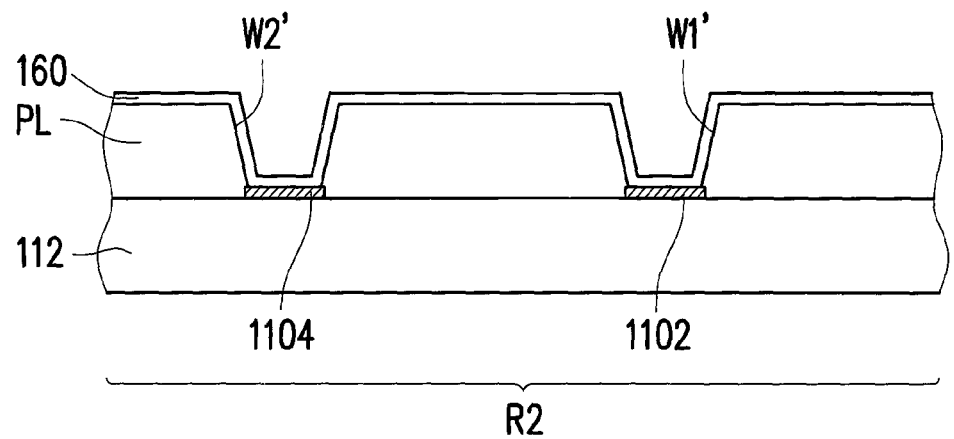
Figure 7C:
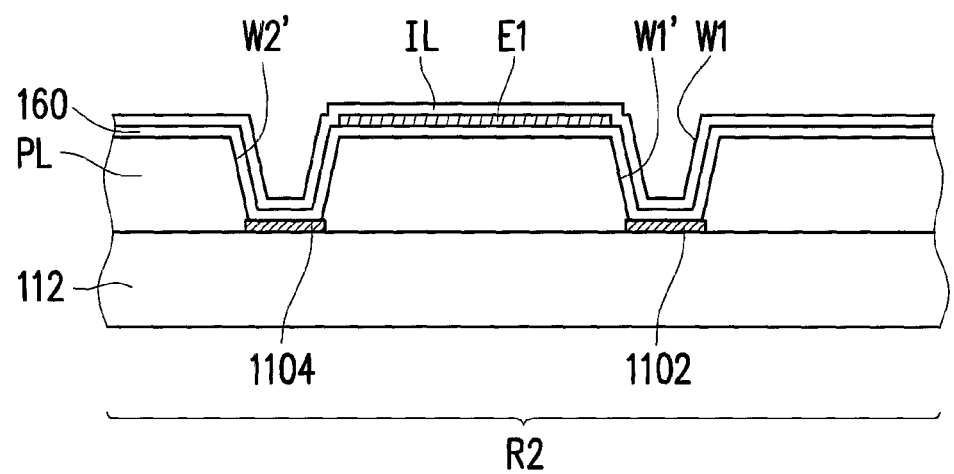
Figure 7D:
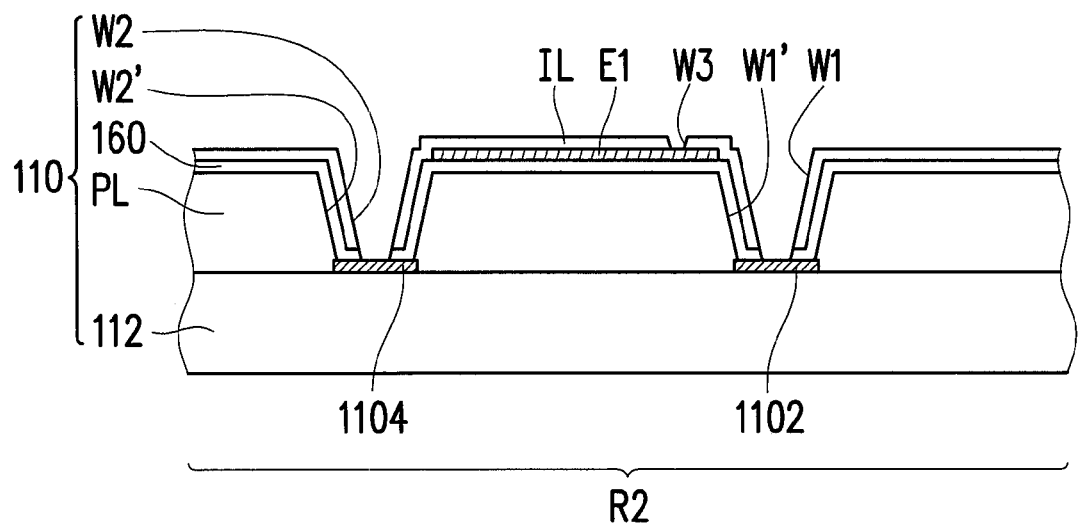

Thereafter, as shown in FIG. 7B, the protection layer 160 is formed on the insulating layer PL. As shown in FIG. 7C, the first transparent electrode layer E1 and the dielectric layer IL are then formed on the protection layer 160 in sequence. The first transparent electrode layer E1 may be formed by performing photolithography and etching processes on a transparent electrode layer (not drawn) by using a mask. Thereafter, with reference to FIG. 7D, photolithography and etching processes using a mask are performed on the dielectric layer IL and the protection layer 160. Moreover, the first transparent electrode layer E1, the first conductive element 1102, and the second conductive element 1104 are used as etch stop layers, such that the first opening W1 and the second opening W2 are formed in the dielectric layer IL and the protection layer 160, and the contact opening W3 is formed in the dielectric layer IL.

Figure 7E:
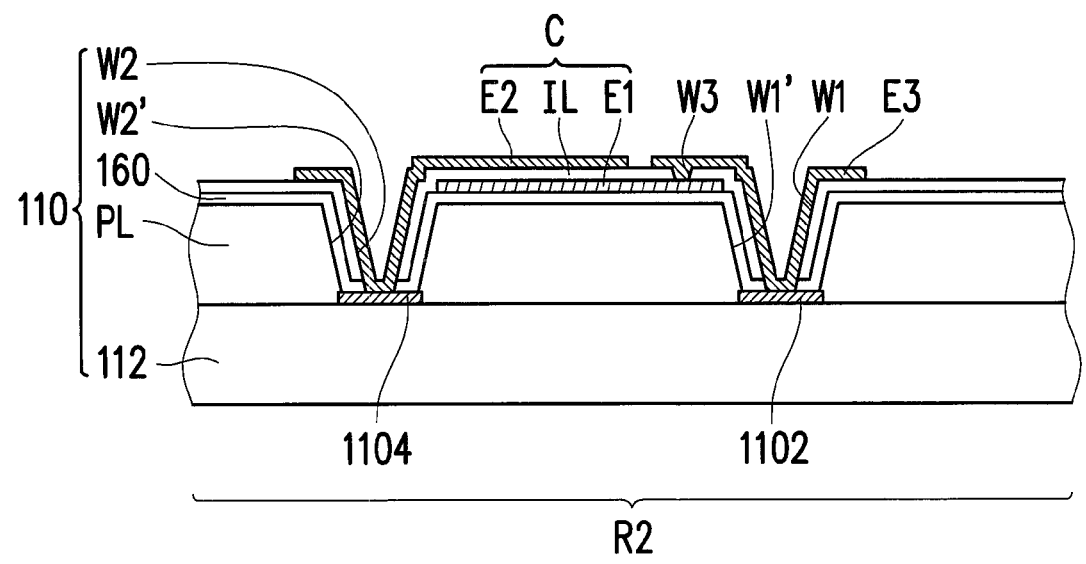

With reference to FIG. 7E, the second transparent electrode layer E2 and the third transparent electrode layer E3 are then formed on the dielectric layer IL. The first transparent electrode layer E1, the second transparent electrode layer E2, and the dielectric layer IL may form the transparent capacitor C on the insulating layer PL. The first transparent electrode layer E1 is electrically connected with the first conductive element 1102 through the contact opening W3, the third transparent electrode layer E3, and the first opening W1. Accordingly, the fabrication of the active array substrate 110 of the display panel 300 in the present embodiment is complete.

Fourth Embodiment

Figure 8:
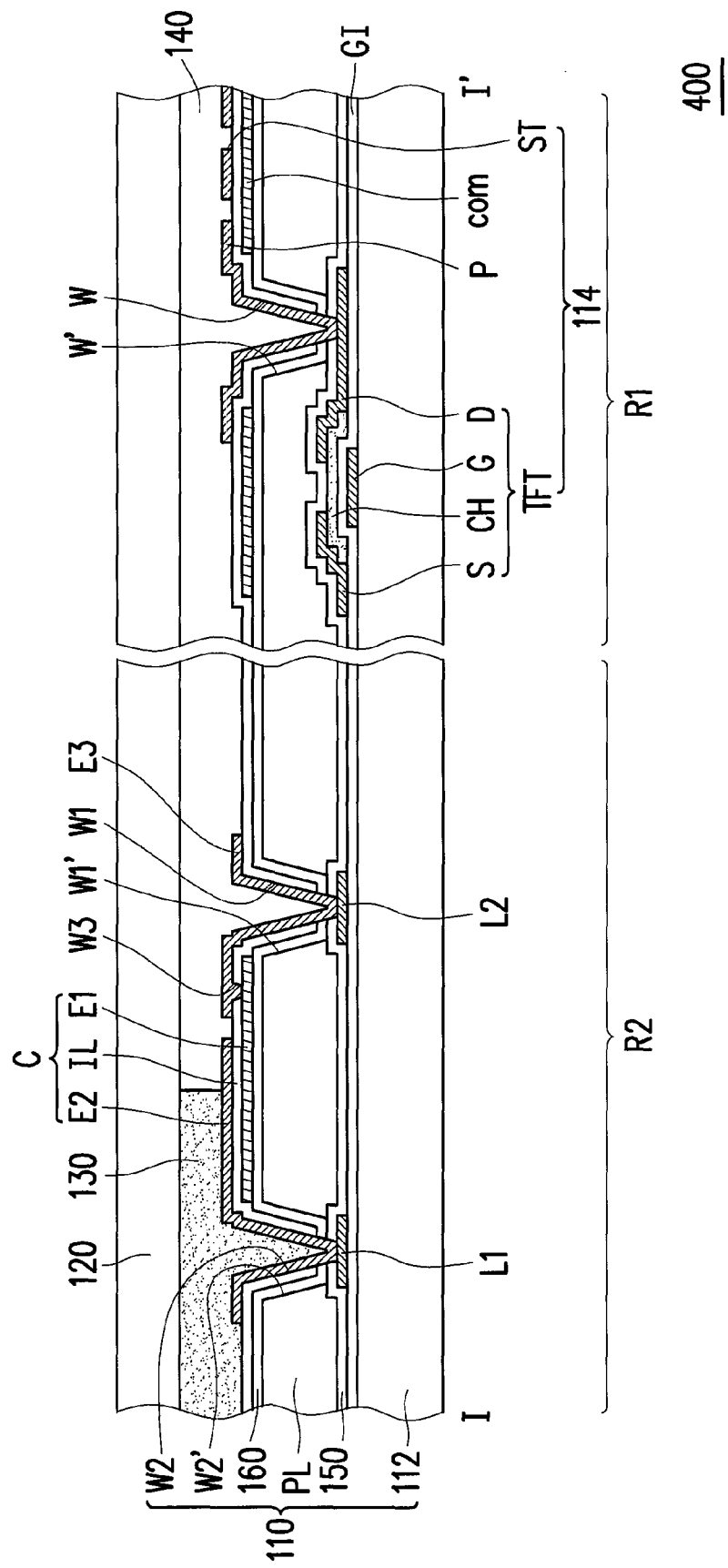
FIG. 8 is a partial cross-section view of the display panel depicted in FIG. 1 along the line I-I' according to a fourth embodiment of the invention.

FIG. 8 is a partial cross-section view of the display panel depicted in FIG. 1 along the line I-I' according to a fourth embodiment of the invention. In the embodiment shown in FIG. 8, amorphous silicon transistors are used to exemplify the TFTs in the display panel to facilitate description, although the invention is not limited thereto. The same or similar elements compared with the embodiment depicted in FIG. 2 are labeled with the same or similar reference numbers, and the description thereof are not repeated. In the present embodiment, the conductive elements of the non-display region R2 may be exemplified as the conductive lines L1 and L2. The conductive lines L1 and L2 may receive clock signals, gate driving signals, or pull-down signals, for example. In specifics, the first transparent electrode layer E1 of the transparent capacitor C is electrically with the conductive line L2 through the contact opening W3, the third transparent electrode layer E3 and the first opening W1. The second transparent electrode layer E2 is electrically connected with the conductive line L1 through the second opening W2. A difference between a display panel 400 and the display panel 100 is in the relative configurations between the pixel array 114 of the display region R1, the transparent capacitor C, and the conductive lines L1 and L2. A fringe field switching (FFS) LCD panel is used as an illustrative example to describe the display panel 400 below.

Only one thin film transistor TFT and one pixel electrode P are drawn in FIG. 8 to facilitate description, although in practice, the pixel array 114 includes a plurality of thin film transistors TFT and a plurality of pixel electrodes P. The thin film transistor TFT includes a gate G, a source S, a channel layer CH, and a drain D. A gate insulating layer GI is located between the gate G and the source S and the drain D, and the channel layer CH is located between the gate insulating layer GI and the source S and the drain D. As shown in FIG. 8, the gate G is formed by patterning a first metal layer (not labeled), and the source S and the drain D are formed by patterning a second metal layer (not labeled). The conductive lines L1 and L2, the source S, and the drain D are formed in a same fabrication step by patterning the same second metal layer (not labeled), although the invention is not limited thereto. In the present embodiment, the protection layer 150 covers the conductive lines L1 and L2, the source S, and the drain D. As a FFS LCD panel, the pixel array 114 of the display panel 400 includes a plurality of pixel electrodes P and common electrodes com.

In the present embodiment, each of the pixel electrodes P has a plurality of alignment slits ST. The invention does not limit the shape of the alignment slits ST, and the shape may be a strip shape or a V shape. As shown in FIG. 8, the common electrodes com and the first transparent electrode layer E1 are formed in a same fabrication step and are located in a same film layer. Moreover, a protection layer 160 is located between the film layer of the common electrodes com and the first transparent electrode layer E1 and the insulating layer PL. The pixel electrodes P and the second transparent electrode layer E2 are formed in a same fabrication step and are located in a same film layer. Moreover, a dielectric layer IL is located between the pixel electrodes P and the common electrodes corn, such that the pixel electrodes P and the common electrodes corn are electrically insulated from each other. The pixel electrodes P and the thin film transistors TFT are electrically connected through the opening W, although the invention is not limited thereto.

As shown in FIG. 8, the sealant 130 may cover a portion of the transparent capacitor C, although the invention is not limited thereto. Similarly, since the transparent capacitor C of the present embodiment can increase the transmittance needed to cure the sealant 130, therefore, a sufficient transparent region can be assured even if the sealant 130 and the transparent capacitor C are completely overlapping. Accordingly, the display panel 400 of the present embodiment can shrink the design of the driving circuit DC including the transparent capacitor C in the sealant 130, and thereby reduce the border of the display panel 400.

Fifth Embodiment

Figure 9:
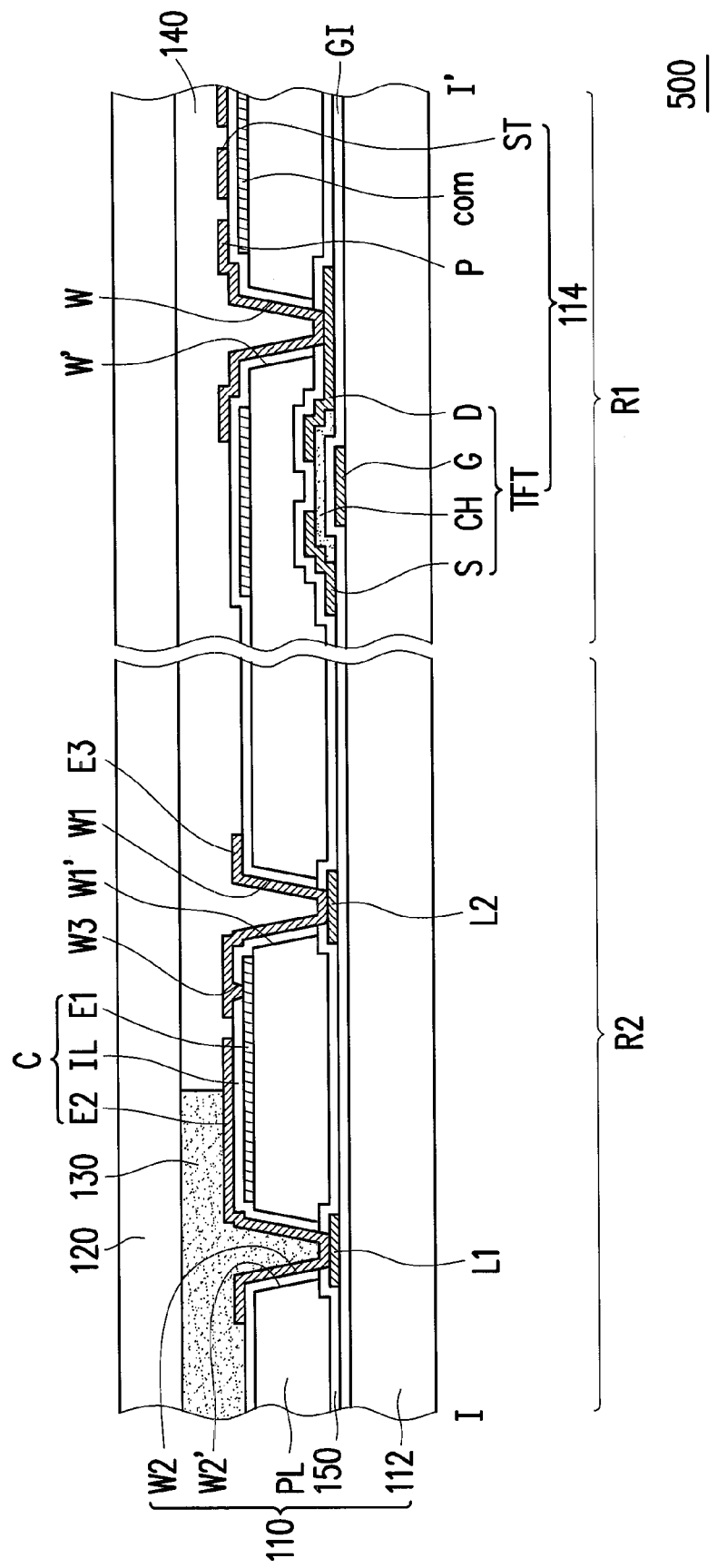
FIG. 9 is a partial cross-section view of the display panel depicted in FIG. 1 along the line I-I' according to a fifth embodiment of the invention.

FIG. 9 is a partial cross-section view of the display panel depicted in FIG. 1 along the line I-I' according to a fifth embodiment of the invention. In the embodiment shown in FIG. 9, amorphous silicon transistors are used to exemplify the TFTs in the display panel to facilitate description, although the invention is not limited thereto. The same or similar elements compared with the embodiment depicted in FIG. 4 are labeled with the same or similar reference numbers, and the description thereof are not repeated. A FFS LCD panel is used as an illustrative example to describe a display panel 500 below. In the present embodiment, the conductive elements of the non-display region R2 may be exemplified as the conductive lines L1 and L2. The conductive lines L1 and L2 may receive clock signals, gate driving signals, or pull-down signals, for example. The first transparent electrode layer E1 of the transparent capacitor C is electrically connected with the conductive line L2 through the contact opening W3, the third transparent electrode layer E3, and the first opening W1. The second transparent electrode layer E2 is electrically connected with the conductive line L1 through the second opening W2. A difference between the display panel 500 and the display panel 200 is in the relative configurations between the pixel array 114 of the display region R1, the transparent capacitor C, and the conductive lines L1 and L2. A FFS LCD panel is used as an illustrative example to describe the display panel 500 below.

Similarly, only one thin film transistor TFT and one pixel electrode P are drawn in FIG. 9 to facilitate description, although in practice, the pixel array 114 includes a plurality of thin film transistors TFT and a plurality of pixel electrodes P. The thin film transistor TFT includes a gate G, a source S, a channel layer CH, and a drain D. A gate insulating layer GI is located between the gate G and the source S and the drain D, and the channel layer CH is located between the gate insulating layer GI and the source S and the drain D. As shown in FIG. 9, the gate G is located in the first metal layer, and the source S and the drain D are located in the second metal layer. The conductive lines L1 and L2, the source S, and the drain D are formed in a same fabrication step and are located in the same second metal layer, although the invention is not limited thereto. In the present embodiment, the protection layer 150 covers the conductive lines L1 and L2, the source S, and the drain D. As a FFS LCD panel, the pixel array 114 of the display panel 500 includes a plurality of pixel electrodes P and common electrodes corn.

In the present embodiment, each of the pixel electrodes P has a plurality of alignment slits ST. The invention does not limit the shape of the alignment slits ST, and the shape may be a strip shape or a V shape. As shown in FIG. 9, the common electrodes corn and the first transparent electrode layer E1 of the transparent capacitor C are formed in a same fabrication step and are located in a same film layer, and this film layer is directly located above the insulating layer PL. The pixel electrodes P, the third transparent electrode layer E3, and the second transparent electrode layer E2 are formed in a same fabrication step and are located in a same film layer. Moreover, a dielectric layer IL is located between the pixel electrodes P and the common electrodes corn, such that the pixel electrodes P and the common electrodes corn are electrically insulated from each other. The pixel electrodes P and the thin film transistors TFT are electrically connected through the opening W, although the invention is not limited thereto.

As shown in FIG. 9, the sealant 130 may cover a portion of the transparent capacitor C, although the invention is not limited thereto. Similar to the display panel 200 of FIG. 4, by using the afore-described improving methods, the display panel 500 according to the present embodiment can also prevent water vapor from deteriorating the transparent capacitor C without requiring the protection layer 160 between the insulating layer PL and the first transparent electrode layer E1. Similarly, since the transparent capacitor C of the present embodiment can increase the transmittance needed to cure the sealant 130, therefore, a sufficient transparent region can be assured even if the sealant 130 and the transparent capacitor C are completely overlapping. Accordingly, the display panel 500 of the present embodiment can shrink the design of the driving circuit DC including the transparent capacitor C in the sealant 130, and thereby reduce the border of the display panel 500.

Sixth Embodiment

Figure 10:
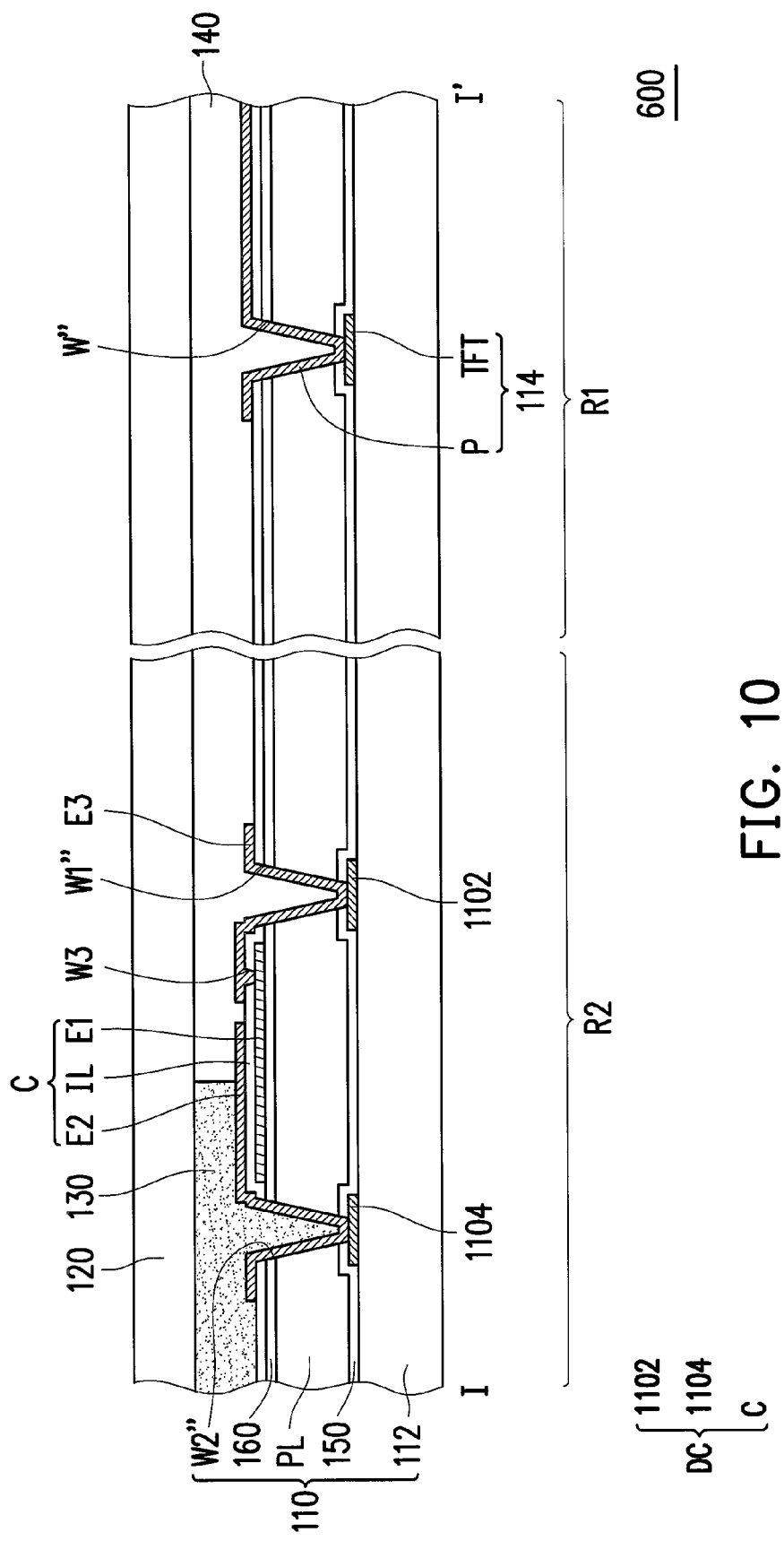
FIG. 10 is a partial cross-section view of the display panel depicted in FIG. 1 along the line I-I' according to a sixth embodiment of the invention.

FIG. 10 is a partial cross-section view of the display panel depicted in FIG. 1 along the line I-I' according to a sixth embodiment of the invention. The embodiment shown in FIG. 10 is similar to the embodiment depicted in FIG. 2, and therefore the same or similar elements are labeled with the same or similar reference numbers, and the description thereof are not repeated. A difference between a display panel 600 and the display panel 100 is in the quantity of the masks used in the fabrication process. Compared to the first embodiment, in the present embodiment, a same mask is used in a photolithography process and a corresponding etching process for the insulating layer PL, the dielectric layer IL, the protection layer 150, and the protection layer 160, so as to simultaneously form an opening W", a first opening W1", a second opening W2", and the contact opening W3. Therefore, compared to the embodiment depicted in FIG. 2, the present embodiment can reduce one mask. Moreover, the invention does not limit the methods of the electrical connection between the first transparent electrode layer E1 and the first conductive element 1102, and the methods of the electrical connection may be adjusted according to the fabrication process or design.

Seventh Embodiment

Figure 11:
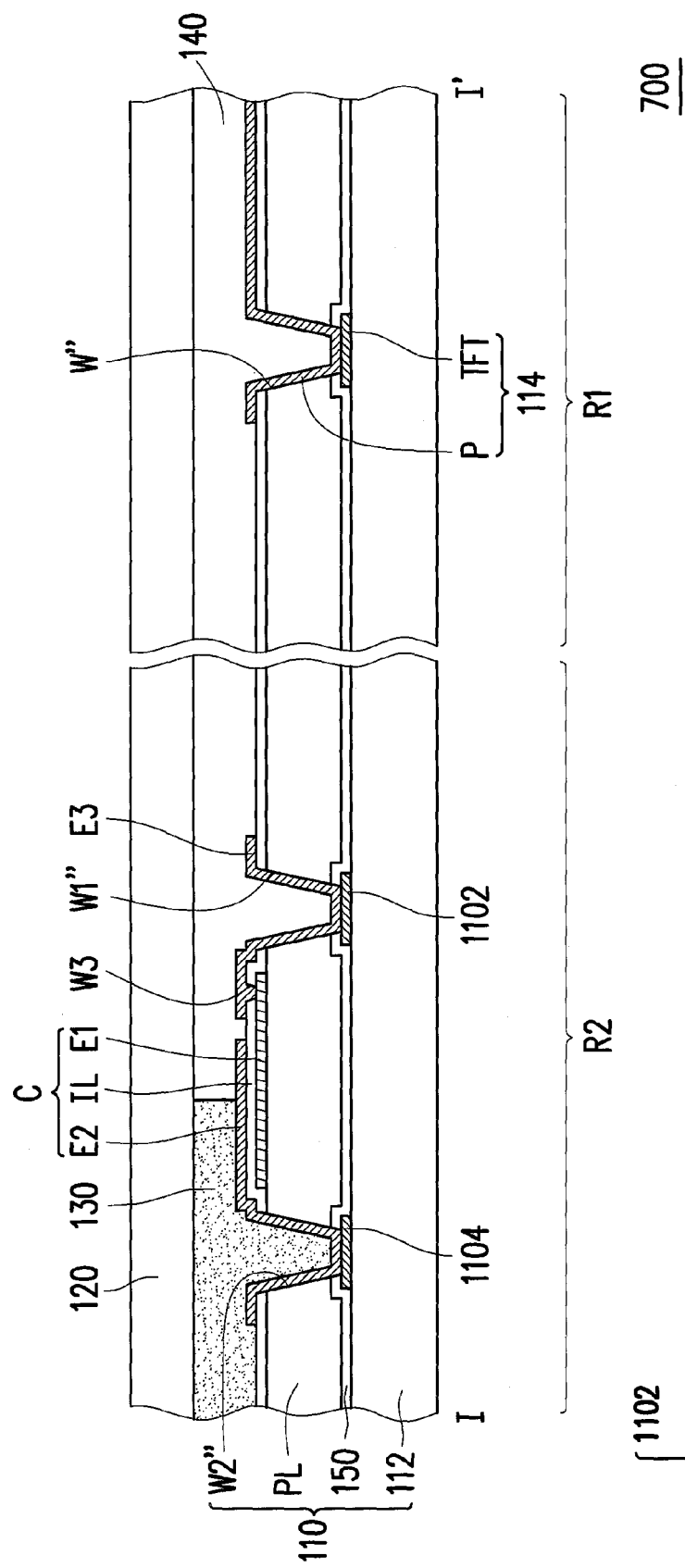
FIG. 11 is a partial cross-section view of the display panel depicted in FIG. 1 along the line I-I' according to a seventh embodiment of the invention.

FIG. 11 is a partial cross-section view of the display panel depicted in FIG. 1 along the line I-I' according to a seventh embodiment of the invention. The embodiment shown in FIG. 11 is similar to the embodiment depicted in FIG. 4, and therefore the same or similar elements are labeled with the same or similar reference numbers, and the description thereof are not repeated. A difference between a display panel 700 and the display panel 200 is in the quantity of the masks used in the fabrication process. Compared to the second embodiment, in the present embodiment, a same mask is used in a photolithography process and a corresponding etching process for the insulating layer PL, the dielectric layer IL, and the protection layer 150, so as to simultaneously form the opening W'", the first opening W1", the second opening W2", and the contact opening W3. Therefore, compared to the embodiment depicted in FIG. 4, the present embodiment can reduce one mask. Moreover, the invention does not limit the methods of the electrical connection between the first transparent electrode layer E1 and the first conductive element 1102, and the methods of the electrical connection may be adjusted according to the fabrication process or design.

Eighth Embodiment

Figure 12:
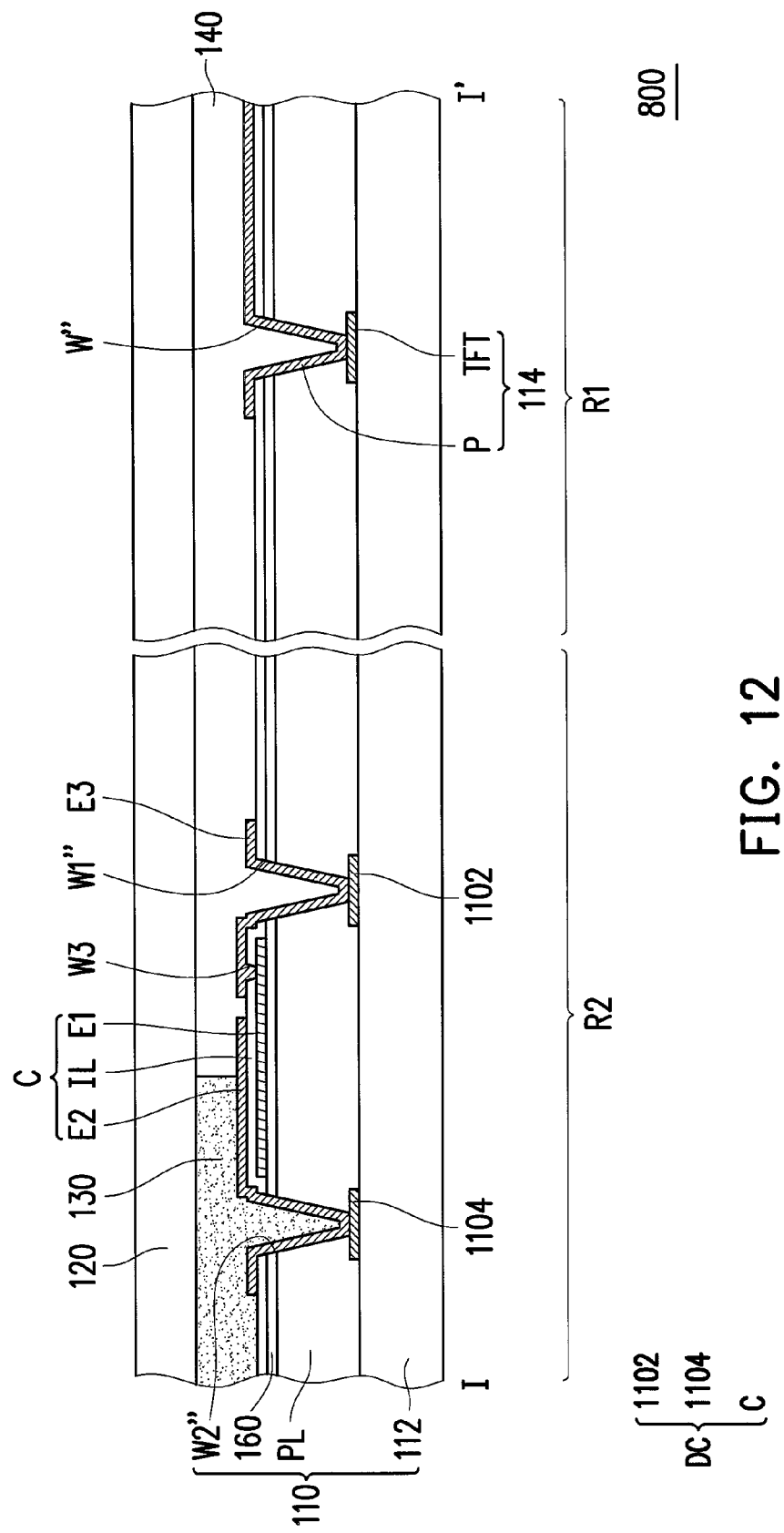
FIG. 12 is a partial cross-section view of the display panel depicted in FIG. 1 along the line I-I' according to an eighth embodiment of the invention.

FIG. 12 is a partial cross-section view of the display panel depicted in FIG. 1 along the line I-I' according to an eighth embodiment of the invention. The embodiment shown in FIG. 12 is similar to the embodiment depicted in FIG. 6, and therefore the same or similar elements are labeled with the same or similar reference numbers, and the description thereof are not repeated. A difference between a display panel 800 and the display panel 300 is in the quantity of the masks used in the fabrication process. Compared to the third embodiment, in the present embodiment, a same mask is used in a photolithography process and a corresponding etching process for the insulating layer PL, the dielectric layer IL, and the protection layer 160, so as to simultaneously form the opening W'", the first opening W1", the second opening W2", and the contact opening W3. Therefore, compared to the embodiment depicted in FIG. 6, the present embodiment can reduce one mask. Moreover, the invention does not limit the methods of the electrical connection between the first transparent electrode layer E1 and the first conductive element 1102, and the methods of the electrical connection may be adjusted according to the fabrication process or design.

Figure 13:
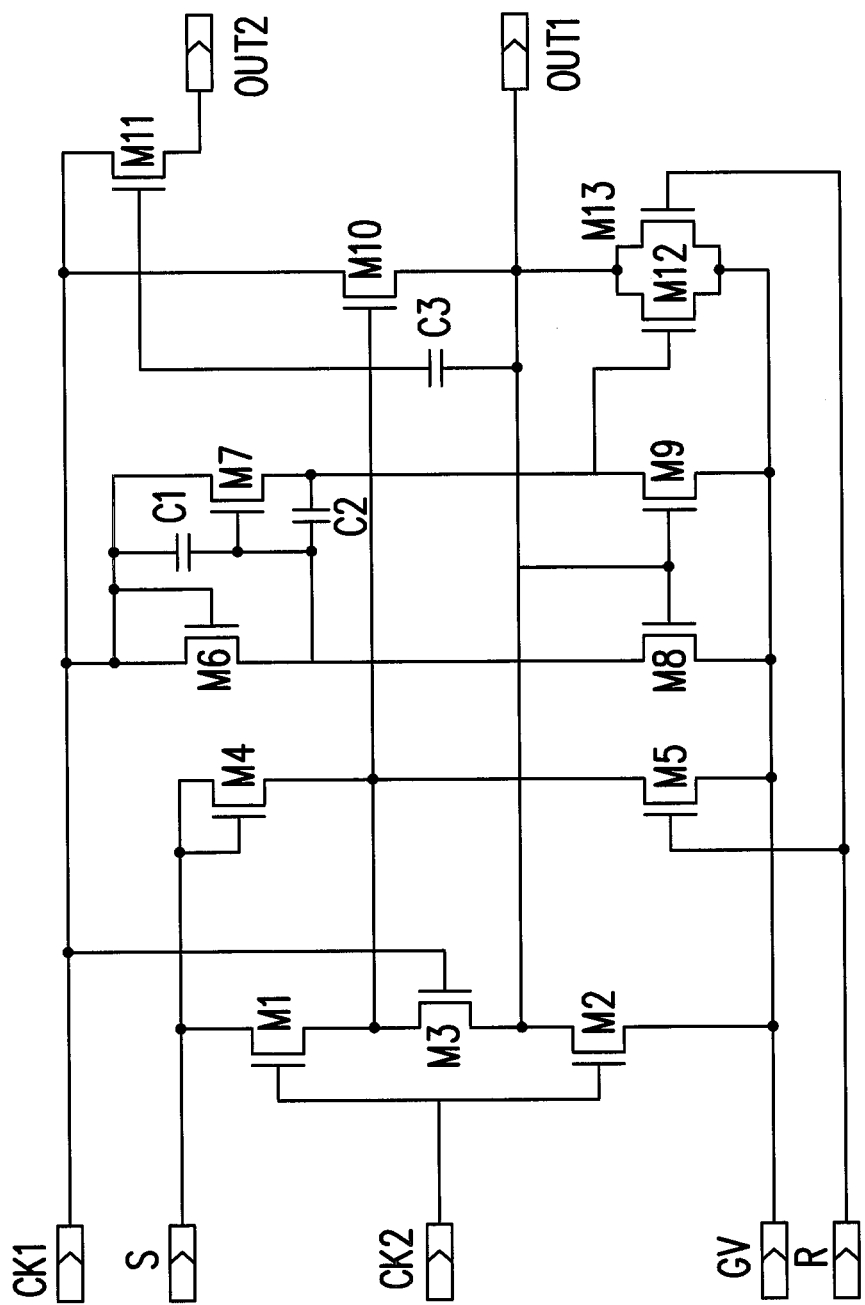
FIG. 13 is an equivalent circuit diagram of a gate driving circuit according to an embodiment of the invention.

FIG. 13 is an equivalent circuit diagram of a gate driving circuit according to an embodiment of the invention. The present embodiment may be applied as a gate driving circuit structure for any one of the first to eighth embodiments. In the present embodiment, at least one of the capacitors C1, C2, and C3 may be any one of the transparent capacitors C from the first to eighth embodiments. Moreover, the electrode layers of the capacitors may be respectively electrically connected to the terminals CK1, CK2, GV, OUT1, OUT2, R, and S of a gate driving circuit, or electrically connected to the gates, sources, or drains in the TFTs M1-M13. In the present embodiment, the TFTs M1-M13 may be thin film transistors that are known to one skilled in the art. It should be noted that, the present embodiment applies the transparent capacitor solely as an example to facilitate description. However, the quantity of the TFTs and the transparent capacitors in the gate driving circuit may be adjusted according to the different designs of the gate driving circuit, and the invention is not limited thereto. Moreover, the transparent capacitors C in the first to eighth embodiments of the invention may also be applied in a source driving circuit. That is, the framework of the driving circuits DC in the first to eighth embodiments of the invention may be applied in a source driving circuit after suitable adjustments in view of the requirements.

The first transparent electrode layer E1, the second transparent electrode layer E2, and/or the third transparent electrode layer E3 of each of the foregoing embodiments may be made of transparent conductive materials such as indium tin oxide (ITO), indium zinc oxide (IZO), aluminum tin oxide (ATO), aluminum zinc oxide (AZO), indium gallium zinc oxide (IGZO), other suitable oxides, or stacked layers of at least two of the foregoing materials. However, thinner metallic conductive materials, alloys thereof, or transparent or translucent films formed by stacked layers of the foregoing materials may also be used. These materials belong in the scope of the invention as long as their transmittance is sufficient for the successful curing of the sealant 130.

In view of the foregoing, the driving circuit of the display panel in the invention includes the transparent capacitor formed by the first transparent electrode layer, the second transparent electrode layer, and the dielectric layer. Since the transparent capacitor can increase the transmittance needed by the sealant curing process, the border of the display panel can be reduced. Furthermore, by stacking the transparent capacitor on the conductive elements or densely arranging the transparent capacitor between the conductive elements through isolation by the insulating layer, the display panel according to embodiments of the invention can reduce the horizontal distance between the transparent capacitor and the conductive elements, and thereby achieve the slim border effect. Accordingly, the border and size of the electronic devices applying to the display panel can be further reduced, which increases the added value of the electronic devices.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A display panel having a display region and a non-display region, the display panel comprising:
    an active array substrate, comprising:
        a substrate; and
        a pixel array and a driving circuit disposed on the substrate, the pixel array located in the display region, and the driving circuit is disposed in the non-display region, wherein the driving circuit comprises:
            a first transparent electrode layer;
            a second transparent electrode layer; and
            a dielectric layer located between the first transparent electrode layer and the second transparent electrode layer, wherein the first transparent electrode layer and the second transparent electrode layer are electrically coupled to each other to form at least one transparent capacitor; and
    an opposite substrate disposed opposite to the active array substrate.

2. The display panel according to claim 1, wherein the driving circuit further comprises:
    a first conductive element and a second conductive element, the first conductive element or the second conductive element being a thin film transistor, a conductive line, or a combination thereof; and
    an insulating layer covering the first conductive element and the second conductive element, wherein the at least one transparent capacitor is located on the insulating layer.

3. The display panel according to claim 2, wherein:
the insulating layer has a first opening and a second opening respectively exposing the first conductive element and the second conductive element; and
the first transparent electrode layer and the second transparent electrode layer are respectively electrically connected to the first conductive element and the second conductive element through the first opening and the second opening.

4. The display panel according to claim 2, further comprising:
a protection layer located on the first conductive element and the second conductive element, and the insulating layer is located on the protection layer, wherein
the insulating layer and the protection layer have a first opening and a second opening respectively exposing the first conductive element and the second conductive element; and
the first transparent electrode layer and the second transparent electrode layer are respectively electrically connected to the first conductive element and the second conductive element through the first opening and the second opening.

5. The display panel according to claim 2, further comprising:
a protection layer located between the insulating layer and the first transparent electrode layer, wherein the insulating layer has a first opening and a second opening respectively exposing the first conductive element and the second conductive element;
the first transparent electrode layer and the second transparent electrode layer are respectively electrically connected to the first conductive element and the second conductive element through the first opening and the second opening.

6. The display panel according to claim 5, wherein:
the dielectric layer has a contact opening, the first transparent electrode layer electrically connecting with the first conductive element through the contact opening and the first opening; and
the second transparent electrode layer is electrically connected with the second conductive element through the second opening.

7. The display panel according to claim 2, further comprising:
a first protection layer located on the first conductive element and the second conductive element, and the insulating layer is located on the first protection layer; and
a second protection layer disposed between the insulating layer and the first transparent electrode layer.

8. The display panel according to claim 7, wherein:
the insulating layer, the first protection layer, and the second protection layer have a first opening and a second opening for respectively exposing the first conductive element and the second conductive element; and
the first transparent electrode layer and the second transparent electrode layer are respectively electrically connected with the first conductive element and the second conductive element through the first opening and the second opening.

9. The display panel according to claim 8, wherein:
the dielectric layer has a contact opening, the first transparent electrode layer being electrically connected with the first conductive element through the contact opening and the first opening; and
the second transparent electrode layer is electrically connected with the second conductive element through the second opening.

10. The display panel according to claim 1, further comprising:
a sealant located between the active array substrate and the opposite substrate, wherein the sealant covers at least a portion of the driving circuit to define a space; and
a display medium located in the space.

11. The display panel according to claim 10, wherein the sealant covers at least a portion of the at least one transparent capacitor.

12. The display panel according to claim 1, wherein the driving circuit is a gate driving circuit, and a voltage difference between the first transparent electrode layer and the second transparent electrode layer is from −40V to +40V.

13. A display panel having a display region and a non-display region, the display panel comprising:
an active array substrate, comprising:
a substrate; and
a pixel array and a driving circuit disposed on the substrate, the pixel array located in the display region, and the driving circuit is disposed in the non-display region, wherein the driving circuit comprises at least one transparent capacitor;
an opposite substrate disposed opposite to the active array substrate; and
a sealant located between the active array substrate and the opposite substrate, wherein the sealant covers at least a portion of the driving circuit.

14. The display panel according to claim 13, wherein the sealant comprises a photo-curable sealant, and the sealant covers at least a portion of the at least one transparent capacitor.

15. The display panel according to claim 13, the driving circuit further comprising:
at least one conductive element; and
an insulating layer covering the at least one conductive element.

16. The display panel according to claim 15, wherein:
the insulating layer has an opening to expose the conductive element; and
the transparent capacitor is electrically connected with the conductive element through the opening.

17. The display panel according to claim 15, further comprising:
a protection layer located on the at least one conductive element, the insulating layer being located on the protection layer; wherein
the insulating layer and the protection layer have an opening exposing the conductive element; and the transparent capacitor is electrically connected with the conductive element through the opening.

18. The display panel according to claim 15, further comprising a protection layer located between the insulating layer and the transparent capacitor, wherein the insulating layer has an opening to expose the conductive element, the protection layer is located on the insulating layer, and the protection layer at least partially exposes the opening to expose the conductive element, and the transparent capacitor is electrically connected with the conductive element through the opening.

19. The display panel according to claim 18, wherein:
the dielectric layer has a contact opening, and the transparent capacitor is electrically connected with the conductive element through the contact opening and the opening.

20. The display panel according to claim 15, further comprising:
- a first protection layer located on the at least one conductive element, and the insulating layer is located on the first protection layer; and
- a second protection layer located between the insulating layer and the transparent capacitor.

21. The display panel according to claim 20, wherein:
the insulating layer and the first protection layer have an opening to expose the conductive element;
the second protection layer is located on the insulating layer, and the second protection layer at least partially exposes the opening to expose the conductive element;
and the transparent capacitor is electrically connected with the conductive element through the opening.

22. The display panel according to claim 21, wherein:
the dielectric layer has a contact opening, and the transparent capacitor is electrically connected with the conductive element through the contact opening and the opening.

* * * * *